Figure 1:
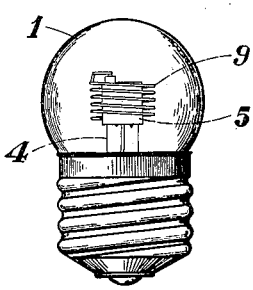

Nov. 12, 1935.  T. E. FOULKE  2,020,722

GASEOUS ELECTRIC DISCHARGE DEVICE

Filed Aug. 2, 1930

INVENTOR
Ted E. Foulke
BY
*Thos. H. Brown*
HIS ATTORNEY

Patented Nov. 12, 1935

2,020,722

UNITED STATES PATENT OFFICE 2,020,722

GASEOUS ELECTRIC DISCHARGE DEVICE

Ted E. Foulke, Nutley, N. J., assignor to General Electric Vapor Lamp Company, Hoboken, N. J., a corporation of New Jersey Application August 2, 1930, Serial No. 472,538

2 Claims. (Cl. 176—126)

The present invention relates to electric gaseous discharge devices, and more particularly to discharge devices in which the cathode glow is utilized as a source of light. The invention consists in a new and novel discharge device of this type, and in the method of producing the same.

A particular object of the invention is to provide a cathode glow discharge device which will have substantially the same appearance when operated on direct current as when operated on alternating current. A further object of the invention is to provide a device of this type which will function satisfactorily on commercial circuits of 100–110 volts D. C. Another object of the invention is to provide a device in which the glow will be uniformly distributed over the electrode surface. Another object of the invention is to provide a device which will have a long useful life. Still another object of the invention is to provide a method of manufacturing a device having these characteristics. Other objects and advantages of the invention will appear from the following detailed specification or from an inspection of the accompanying drawing.

The production of cathode glow lamps which would operate on direct current circuits of 100–110 volts and still having a long useful life has long been a problem. In my Patent 1,965,583 granted July 10, 1934, I have described a method of treating the electrodes of such devices with alkaline compounds to decrease the work function thereof, as a result of which it is possible to construct cathode glow devices which will operate satisfactorily on as low as 50 volts D. C. An essential feature of this method when a preferred compound, such as an alkaline carbonate is used, is the heating of the electrodes to a considerable temperature after the envelope in which they are sealed has been evacuated, in order to decompose the alkaline compound. While this method is easily carried out when sheet metal electrodes of appreciable thickness are employed, I have found that it is extremely difficult to produce the required temperature in helical wire electrodes, such as have heretofore been employed in so-called universal lamps which are designed to have substantially the same appearance when operated on either direct or alternating current. I have now discovered that I can overcome this difficulty by altering the structure of these universal lamps of the prior art so that the electrodes may be treated by a modification of the process described in my earlier application, with the result that this type of lamp can now for the first time be made to operate on 100–110 volt direct current circuits with assurance that the lamps will continuously operate despite decreases in potential due to such line voltage fluctuations as are normally to be expected. This new result is accomplished by making one electrode of the universal lamp in the form of a cylinder, while the other electrode is preferably formed as a helix about this cylinder. According to my new method the cylindrical electrode alone is coated with an alkaline or alkaline earth compound, such as potassium hydroxide or barium carbonate, this coating being later reduced to the oxide form by heating the cylindrical electrode to the decomposition temperature of said compound. Some of this metal is later sputtered onto the helix by electrical bombardment of the cylindrical electrode, a portion of the sputtered metal being again oxidized thereon by the free oxygen released by the bombardment of the cylinder, a surface coating being thereby produced on the helix which is identical with that on the cylindrical electrode. The device will therefore work equally well on either alternating current or direct current of either polarity and upon the application of potentials as low as 50 volts D. C., due to the low work function of the coating on each electrode.

Figure 3:
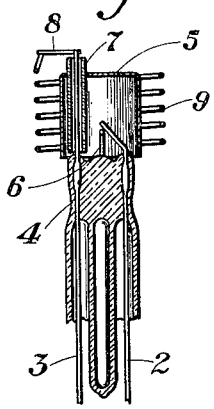
Figure 2:
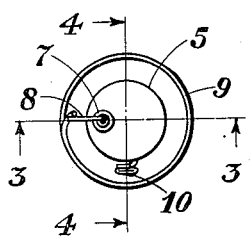
Figure 4:
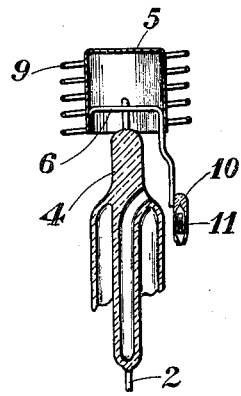
Figure 5:
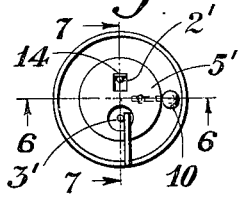
Figure 8:
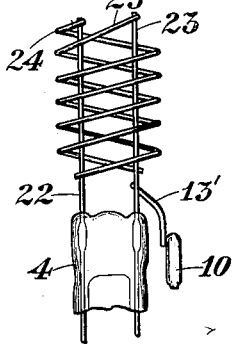
Figure 7:
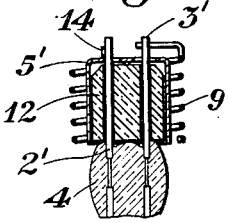
Figure 6:
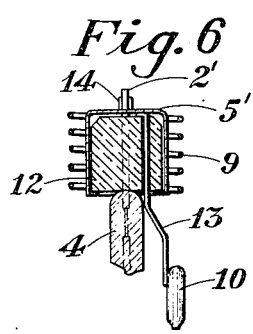

For the purpose of illustrating my invention I have shown a cathode glow discharge device embodying a preferred form thereof, together with two modified electrode structures therefor, in the accompanying drawing, in which Fig. 1 is an elevational view of a universal cathode glow lamp, Fig. 2 is an enlarged plan view of the electrode assembly therein, Figs. 3 and 4 are sectional views of the electrode assembly of Figs. 1 and 2 taken on the lines 3—3 and 4—4, respectively, of Fig. 2, Fig. 5 is an enlarged plan view of an alternative form of electrode assembly, Figs. 6 and 7 are sectional views of the electrode assembly of Fig. 5, taken on the lines 6—6 and 7—7, respectively, of Fig. 5, and Fig. 8 is an elevational view of another electrode structure embodying my invention.

In the drawing, with particular reference to Figs. 1–4, the sealed envelope 1 of glass or the like has sealed thereinto the inleads 2 and 3 of dumet or other suitable material, said leads passing through the conventional stem press 4. A hollow cylindrical electrode 5 having one closed end is supported, open end downward, above the stem press 4 by means of the inlead 2, which is welded to a transverse supporting member 6 located in the open end of said electrode 5. The inlead 3 extends through a suitable opening in the closed end of the electrode 5 and is insulated therefrom by the tubular vitreous sheath 7, which also effectively prevents a discharge taking place to said inlead 3 within the hollow electrode 5. By making the sheath 7 fill the aforesaid opening in the end of the electrode 5 a second point of support for said electrode is obtained. A transverse supporting wire 8 which is welded to said inlead 3 above the sheath 7 carries at its outer end the helical electrode 9 which is concentrically located with respect to the cylindrical electrode 5. A downwardly extending projection of the transverse support 6 carries a tubular getter pellet 10 which is mounted adjacent to the stem press 4. A small quantity of magnesium 11 or the like is retained within the pellet 10 by the crimped in edges of the opening in the lower end of said pellet, the upper end of said pellet being entirely closed.

In the alternative structure of Figs. 5-7, the inleads 2' and 3' are similarly sealed through a stem press 4. A cylindrical insulating body 12 of lavite, porcelain, or other suitable material is mounted on said stem press 4, being held in place thereon by the inleads 2' and 3' which pass through suitable longitudinal openings in said insulator 12. A getter pellet 10 is supported adjacent to the stem press 4 by the wire 13 which passes upwardly through a third longitudinal opening in the insulating body 12, the upper end of said wire 13 being bent over and resting on the top of said insulator. A hollow cylindrical electrode 5' having a closed end is mounted upon the insulating body 12, which it rather closely fits, suitable openings being provided in the closed end of said electrode for passage of the inleads 2' and 3' therethrough. Said opening for the electrode 2' is preferably made by punching up the tab 14 to which said lead 2' is spot welded, thereby maintaining the entire assembly in fixed relation; while the opening in said electrode 5' about the inlead 3' is large enough to preclude any contact therebetween. The helix 9 is welded to the exposed end of the inlead 3', by which it is supported in concentric relation with respect to the cylindrical electrode 5'.

In the modification shown in Fig. 8 the inleads 22 and 23 are sealed through the stem press 4. A helical electrode 24 is attached at each end to the inlead 22, while the similar helical electrode 25 is attached at each end to the inlead 23, said helix 25 being evenly spaced between the turns of the helical electrode 24. A getter pellet 10 is supported adjacent to the stem press 4 by the wire 13' which is attached to the inlead 23.

In lamps having the structure illustrated in Figs. 1-4 the electrodes 5 and 9 may be made of either nickel, iron, or the like, but the helical electrode 9 is preferably made of iron, since iron heats up more rapidly in an inductive field than does nickel. Where iron is used it is preferably nickel plated, since it has been found that a better active surface can be prepared on nickel. The getter pellet 10 is preferably made of iron in order to facilitate the electromagnetic heating thereof, while the supporting member 6, to which said pellet is attached, is preferably made of nickel to reduce the heating effect of an inductive field thereon. Similarly in lamps constructed as shown in Figs. 5-7, the electrode 5' is preferably of nickel, the helical electrode 9 of nickel plated iron, the getter pellet 10 of iron, and the pellet supporting wire 13 of nickel, for the reasons hereinbefore set forth. In a lamp constructed as shown in Fig. 8 the electrodes 24 and 25 are preferably made of iron with a nickel plated surface, in order to facilitate the heating thereof, while the getter pellet 10 is of iron and the supporting wire 13' of nickel, as in the previous structures. All the metal parts are preferably hydrogen fired before use since it has been found that the hydrogen can be more easily driven therefrom than can the gases normally found therein during the evacuation process.

In the manufacture of lamps such as shown in Figs. 1-7 the electrode structure is first assembled as shown in the figures, with the exception of the helical electrode 9. The electrode 5 or 5' is then coated on its exterior surface with an alkaline compound which is reducible to the oxide, such as barium or strontium carbonate or potassium hydroxide. The helical electrode 9 is then mounted and the stem 4 sealed into the envelope 1 in the usual manner. The lamp is then placed in an oven and heated to 450° C. for about 10 minutes, during which interval a high vacuum is maintained therein, in order to drive out all occluded gases or vapors. With the vacuum still maintained a high frequency coil is held for about 15 seconds with its axis normal to that of the electrode structure, whereby the heating effect is concentrated in the helical electrode 9, raising the apparent brightness temperature thereof to approximately 600° C., with the result that the surface thereof is effectively cleared of any oxide, this process being materially aided by the evolution of stored hydrogen from the electrode. The high frequency coil is then placed about the envelope 1 with its axis coinciding with that of the electrode structure and a field applied. In this position the heating effect is concentrated on the electrode 5 or 5', raising it to an apparent brightness temperature of about 1000° C., the true temperature being sufficient to cause a breaking up of the carbonate or other compound, leaving the oxide on said electrode 5 or 5'. This heating is continued so long as any gas is evolved. The high frequency coil is then lowered to concentrate the heating effect thereof on the getter pellet 10, which is so mounted as not to be appreciably heated during the previous operations, causing the magnesium therein to vaporize. This vaporized magnesium is directed by the orifice in said pellet to the lowest part of the envelope 1, where it will not interfere with the light emission from the device, and condenses thereon in a thin film.

The envelope 1 is then filled with mercury vapor, neon, helium, or other suitable gas or vapor or mixtures thereof. For example, a filling of neon with from .2% to .8% of argon at a pressure of 35 m. m. of mercury has been found to have desirable characteristics. Such a lamp will operate satisfactorily on potentials as low as 50 volts D. C. The lamp is then sealed off.

The inleads 2 and 3, or 2' and 3', are then connected to a source of pulsating or alternating potential of steep wave front to produce an electronic and ionic bombardment of the electrode 5 or 5'. An unsymmetrical alternating current, so applied that the half cycle of greater potential occurs when the helix 9 is negative, is especially desirable for this purpose, since it has been found that the helix is more uniformly coated by the bombardment resulting therefrom. This bombardment, which not only reduces the oxide to the metallic form, but also sputters some of the reduced metal onto the helical electrode 9, is preferably continued until there is no visible evidence of the oxide coating on the electrode 5 or 5'. The coating remaining on said electrode 5 or 5' is believed to consist of a thin coating of the alkaline metal, cemented in place by an invisible, monomolecular layer of the oxide. Such a coating has been found to not only provide a low breakdown potential, but to have a long life, since no observable sputtering of the alkaline metal occurs during the long life operation of the device. Some of the oxygen evolved during this bombardment causes the formation of a similar oxide layer on the helical electrode 9, which tends to cement the sputtered alkaline metal coating thereon, the remaining oxygen combining with the magnesium film, which serves to maintain a desired gaseous purity throughout the life of the device. The resulting active coating on the helical electrode 9, which is thus similar in all respects to that remaining on the electrode 5 or 5', could not be produced thereon by coating said electrode directly with the carbonate or other suitable compound, since this electrode cannot be heated efficiently by known methods to achieve the desired result. This intermixture of the alkaline metal with the oxide thereof has been found to be especially effective in reducing the breakdown and operating potential of cathode glow lamps, at the same time giving them a long useful life. The lamp is then based in a conventional manner, as shown in Fig. 1, a suitable ballast resistance preferably being concealed within the base.

Some minor variations in the electrical characteristics of such devices ordinarily occur during the first few hours of use. These can be eliminated by operating the lamp a short time with more than normal potential applied thereto, after which the lamp may be put into commercial use without further appreciable change in the characteristics thereof throughout a long useful life.

With a lamp constructed as shown in Fig. 8 a similar procedure is followed, except that in this case each of the electrodes 24 and 25 can be coated with the alkaline compound, since due to the short circuiting of the turns of each of these electrodes it is possible to generate enough heat therein by application of a high frequency inductive field thereto to decompose this compound to the oxide.

While I have illustrated my invention by reference to specific embodiments thereof, it is to be understood that it is not limited thereto, but that various changes, omissions and substitutions, within the scope of the appended claims, may be made in the product or in the steps of the process without departing from the spirit thereof.

I claim as my invention:

1. The method of producing a gaseous discharge device having a plurality of electrodes which comprises coating only one of said electrodes with an alkaline compound which is reducible to the oxide, heating said electrode to a temperature sufficient to reduce said compound to the oxide, providing a gaseous atmosphere about said electrodes, and thereafter producing a steep wave front bombardment of said coated electrode to reduce some of said oxide to the metal, and to sputter some of said metal onto another electrode.

2. A gaseous discharge lamp for operation on either alternating or direct current comprising a sealed envelope containing a gaseous atmosphere, a thimble-shaped electrode therein, means to rigidly support said electrode at two spaced apart points, a helical electrode surrounding said first mentioned electrode, and a coating of an alkaline metal intermixed with the oxide thereof on said helical electrode and on the outer surface of said thimble-shaped electrode.

TED E. FOULKE.